(12) United States Patent
Blain (10) Patent No.: US 11,298,885 B2
(45) Date of Patent: Apr. 12, 2022

(54) THREE-DIMENSIONALLY ARTICLE WITH KNOCK OUT SUPPORT DEFINED WITH BUILD MATERIAL

(71) Applicant: 3D Systems, Inc., Rock Hill, SC (US)

(72) Inventor: Colin Leonard Blain, Hertfordshire (GB)

(73) Assignee: 3D Systems, Inc., Rock Hill, SC (US)

( * ) Notice: Subject to any disclaimer, the term of this patent is extended or adjusted under 35 U.S.C. 154(b) by 261 days.

(21) Appl. No.: 16/682,396

(22) Filed: Nov. 13, 2019

(65) Prior Publication Data

US 2020/0147894 A1 May 14, 2020

Related U.S. Application Data

(60) Provisional application No. 62/760,962, filed on Nov. 14, 2018.

(51) Int. Cl.
*B29C 64/245* (2017.01)
*B29C 64/393* (2017.01)
(Continued)

(52) U.S. Cl.
CPC .......... *B29C 64/393* (2017.08); *B29C 64/245* (2017.08); *B29C 64/40* (2017.08);
(Continued)

(58) Field of Classification Search
CPC ... B29C 64/124; B29C 64/112; B29C 64/245; B29C 64/40; B29C 64/386;
(Continued)

(56) References Cited

U.S. PATENT DOCUMENTS

2004/0006405 A1  1/2004  Chen et al.
2015/0037587 A1*  2/2015  Sella ................. B29C 64/112
                                                    428/411.1
(Continued)

OTHER PUBLICATIONS

PCT International Search Report for International Search Authority for PCT/US2019/061148, dated Mar. 9, 2020.
(Continued)

*Primary Examiner* — Joseph S Del Sole
*Assistant Examiner* — Lawrence D. Hohenbrink, Jr.

(57) ABSTRACT

A method of manufacturing a three-dimensional article includes (1) receiving a data file, (2) analyzing the data file, and (3) defining a support structure. The data file defines a hollow three-dimensional article to be formed from a build material. Analyzing the data file includes identifying an opening that converges to an apex along the sequence of layers. The opening is at least partly defined by an inside edge of the three-dimensional article. The support structure is attached to the edge and closes the opening. The support structure includes a structural sheet portion and an interface web portion. The structure sheet portion defines a majority of an area of the support structure except for a boundary contour between the structural sheet portion and the inside edge. The interface web portion closes the boundary contour and defines a weakness contour for removing the structural portion from the three-dimensional article.

20 Claims, 6 Drawing Sheets

(51) Int. Cl.
| | |
|---|---|
| *B29C 64/40* | (2017.01) |
| *B33Y 10/00* | (2015.01) |
| *B33Y 30/00* | (2015.01) |
| *B33Y 40/00* | (2020.01) |
| *B33Y 50/02* | (2015.01) |
| *B22F 5/10* | (2006.01) |
| *B22F 3/11* | (2006.01) |
| *B22F 10/47* | (2021.01) |
| *B33Y 50/00* | (2015.01) |
| *B29C 64/124* | (2017.01) |
| *B29C 64/112* | (2017.01) |
| *B22F 10/40* | (2021.01) |
| *B29C 64/386* | (2017.01) |

(52) U.S. Cl.
CPC .... *B22F 3/11* (2013.01); *B22F 5/10* (2013.01); *B22F 10/40* (2021.01); *B22F 10/47* (2021.01); *B29C 64/112* (2017.08); *B29C 64/124* (2017.08); *B29C 64/386* (2017.08); *B33Y 10/00* (2014.12); *B33Y 30/00* (2014.12); *B33Y 40/00* (2014.12); *B33Y 50/00* (2014.12); *B33Y 50/02* (2014.12)

(58) Field of Classification Search
CPC ....... B29C 64/393; B33Y 10/00; B33Y 50/00; B33Y 50/02; B22F 5/10; B22F 3/11; B22F 10/40; B22F 10/47
USPC .......................................................... 264/308
See application file for complete search history.

(56) References Cited

U.S. PATENT DOCUMENTS

| | | |
|---|---|---|
| 2015/0360421 A1 | 12/2015 | Burhop et al. |
| 2017/0095887 A1 | 4/2017 | Marchione |
| 2018/0154441 A1 | 6/2018 | Miller et al. |
| 2018/0162062 A1 | 6/2018 | Mark |

OTHER PUBLICATIONS

PCT Written Opinion for International Search Authority for PCT/US2019/061148, dated Mar. 9, 2020.

* cited by examiner

THREE-DIMENSIONALLY ARTICLE WITH KNOCK OUT SUPPORT DEFINED WITH BUILD MATERIAL

CROSS-REFERENCE TO RELATED APPLICATIONS

This non-provisional patent application claims priority to U.S. Provisional Application Ser. No. 62/760,962, Entitled "Three-Dimensionally Article with Knock Out Support Defined with Build Material" by Colin Blain, filed on Nov. 14, 2018, incorporated herein by reference under the benefit of U.S.C. 119(e).

FIELD OF THE INVENTION

The present disclosure concerns a method for a digital formation of three-dimensional articles of manufacture. More particularly, the present disclosure concerns a removable support structure to fill internal openings formed from build material.

BACKGROUND

Three-dimensional printers are in widespread use. One major categorization of three-dimensional printers are those that manufacture three-dimensional articles through curing or fusion of a three-dimensional print media in a layer-by-layer manner. Curing refers to a selective solidification of a liquid through the application of electromagnetic radiation. Fusion refers to a selective melting or sintering of a metallic or thermoplastic powder through application of an energy beam such as a laser beam, a particle beam, or an electron beam.

One challenge is the generation of a hollow article having an internal opening. By "internal" opening the opening is fully bounded during the manufacturing process and at least partly bounded by a perimeter edge defined by build material along which the opening converges or narrows during the sequence of layers being solidified. Due to material shrinkage, a "witness mark" defect can be left behind at an apex of such an internal opening.

SUMMARY

In a first aspect of the disclosure, a method of manufacturing a three-dimensional article with a sequence of layers includes (1) receiving a data file, (2) analyzing the data file, and (3) defining a support structure. The data file defines a hollow three-dimensional article to be formed from a build material. Analyzing the data file includes identifying an opening that converges to an apex along the sequence of layers. The opening is at least partly defined by an inside edge of the three-dimensional article that extends at least partly in a vertical direction. The support structure is attached to the edge and closes the opening. The support structure includes a structural sheet portion and an interface web portion. The structure sheet portion defines a majority of an area of the support structure except for a boundary contour between the structural sheet portion and the inside edge. The interface web portion closes the boundary contour and defines a weakness contour for removing the structural portion from the three-dimensional article.

Having a continuous connection between the support structure and article along the apex of the opening prevents the formation of "witness marks" that can otherwise form at the apex. A witness mark is an unintended features such as an unintended raised ridge that can form near the apex of the article.

In one implementation the inside edge completely bounds the opening.

In another implementation a combination of the inside edge and a support plate or tray bounds the opening.

In a further implementation the three-dimensional article has a model thickness around the inside edge and the structural sheet has a sheet thickness that is at least 30% of the model thickness along the edge.

In a yet further implementation the structural sheet has a sheet thickness and the interface web portion has a thickness that is less than 50% of the sheet thickness. The interface web portion can have a thickness that is less than 10% of the sheet thickness. The interface web portion may have a thickness of only one or two times a minimum resolution of the light engine.

In another implementation the method includes printing the article with the attached support structure out of a single build material. The method also includes impacting the structural sheet material to sever the support from the three-dimensional article along the weakness contour.

In another aspect of the disclosure, a three-dimensionally fabricated structure includes a three-dimensional article and a support structure. The three-dimensional article has an internal edge that defines an opening. The support structure closes the opening and includes a structural sheet portion and an interface web portion. The structural sheet portion defines a majority of an area of the support except for a thin boundary contour between the internal edge and an outer edge of the structural sheet portion. The interface web portion spans the thin boundary contour and defines a weakness contour that at least partly bounds the structural sheet portion.

DETAILED DESCRIPTION OF THE PREFERRED EMBODIMENTS

Figure 1A:
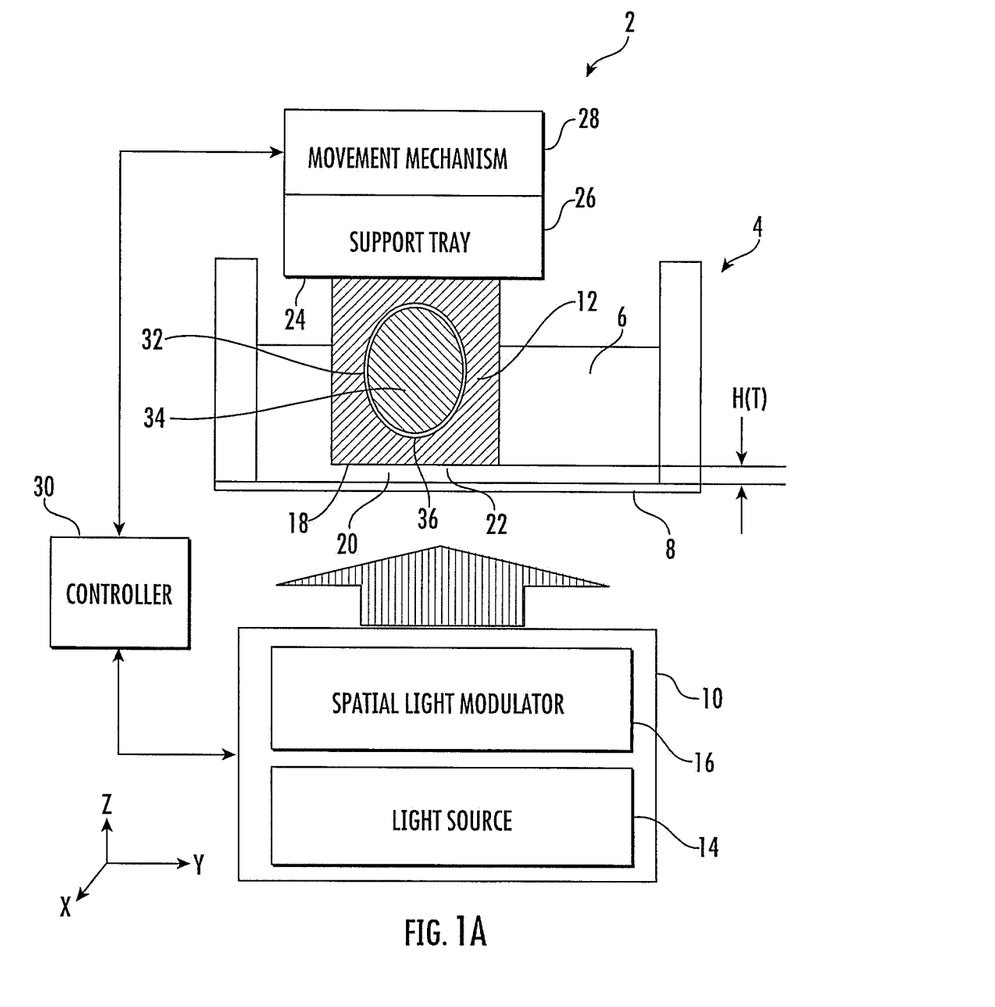
FIG. 1A is a schematic block diagram depicting a first embodiment of a three-dimensional (3D) printing system.

FIG. 1A is a schematic block diagram depicting a first embodiment of a three-dimensional (3D) printing system 2. In this and other figures, mutually perpendicular axes X, Y and Z will be used. Axes X and Y are lateral or generally horizontal axes. Axis Z is a vertical axis that is generally aligned with a gravitational reference. The direction +Z is generally upward and the direction −Z is generally downward.

System 2 includes a resin vessel 4 containing photocurable resin 6. Vessel 4 includes a transparent sheet 8 forming at least a portion of a lower portion of vessel 4. A light engine 10 is disposed and configured to selectively project light up through the transparent sheet 8 to selectively cure the photocurable resin 6 during formation of a three dimensional article of manufacture 12. In one embodiment, light engine 10 can include a light source 14 and a spatial light modulator 16.

Between a lower face 18 of the three dimensional article of manufacture 12 and the transparent sheet 8 is a thin layer 20 of photocurable resin 6. As the light engine 12 operates, a portion of the thin layer 20 of photocurable resin 6 is cured and solidified at and proximate to a build plane 22. Build plane 22 defines a lateral extent (along X and Y) of a layer of photocurable resin that the light engine 10 is capable of curing when forming the three dimensional article of manufacture 12.

The three-dimensional article 12 is supported on a lower surface 24 of a support tray or plate 26. The support tray 26 is coupled to a movement mechanism 28 that controllably positions the support tray 26 along the vertical axis Z.

A controller 30 is coupled to the light engine 10 and the movement mechanism 28. Controller 30 includes a processor coupled to an information storage device including a non-volatile or non-transient device storing software instructions. The software instructions, when executed by the processor, manufacture the three-dimensional article 12 with the following steps: (1) The lower surface (or lower face 18) is positioned at the build plane 22. (2) The light engine 10 is operated to selectively cure a layer of resin at the build plane. (3) Steps (1) and (2) are repeated to form the three-dimensional article in a layer-by-layer manner.

The layers are progressively formed as the lower surface 24 of the support tray 26 is raised. The first layer forms on the surface 24 and subsequent second, third, fourth, ... N, N+1 layers are formed onto the lower face 18. Thus the direction of formation of layers is downward for the three-dimensional article.

In the illustrated embodiment, the three dimensional article has an internal opening 32 that is spanned by a support structure 34. Both the three-dimensional article 12 and the support structure 34 are formed from the same build material. The internal opening 32 has an apex 36 at which the opening converges in a direction of increasing layer numbers. The direction of increasing layer numbers, N, N+1, etc., is the order in which the layers are deposited. In other words, N+1 is deposited and selectively cured over previously deposited and selectively cured layer N. The opening 32 converges to the apex 36 as the layer number increases.

Figure 1B:
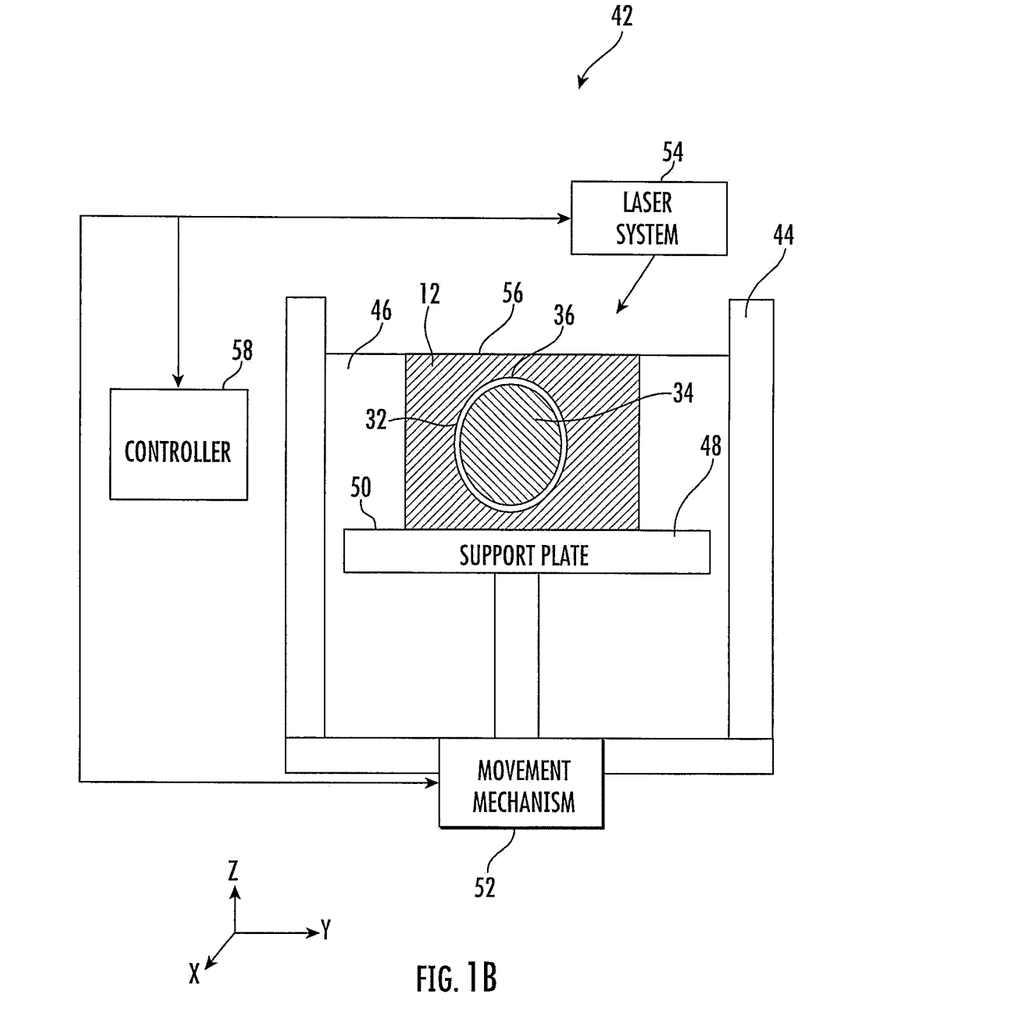
FIG. 1B is a schematic block diagram depicting a second embodiment of a three-dimensional (3D) printing system.

FIG. 1B is a schematic block diagram depicting a second embodiment of a three dimensional (3D) printing system 42. System 42 includes a resin vessel 44 containing resin 46. Within the resin vessel is a support plate 48 with a top surface 50 that supports a three-dimensional article 12 being formed. The support plate 48 is vertically positioned by a movement mechanism 52.

A laser system 54 is configured to scan a laser beam over a top surface 56 of the resin 46 to selectively cure a thin layer of resin over surface 50 or the top of any previously formed layers. Layers of the three-dimensional article 12 are thus formed sequentially with an increasing layer number in an upward direction.

A controller 58 is coupled to the movement mechanism 52 and the laser system 54. The controller 58 includes a processor coupled to an information storage device including a non-volatile or non-transient device storing software instructions. The software instructions, when executed by the processor, manufacture the three-dimensional article 12 with the following steps: (1) An upper surface of the support plate 48 or three-dimensional article 12 is positioned at a build plane. (2) A thin layer of resin is formed to define the upper surface 56 of resin. (3) The laser system 54 is scanned over the upper surface 56 to selectively cure and accrete a layer of the three-dimensional article 12. Steps (1)-(3) are repeated to form the three-dimensional article in a layer-by-layer manner.

In the illustrated embodiment, the three dimensional article 12 has an internal opening 32 that is spanned by a support structure 34. Both the three-dimensional article 12 and the support structure 34 are formed from the same build material. The internal opening 32 has an apex 36 at which the opening converges in a direction of increasing layer numbers. The direction of increasing layer numbers, N, N+1, etc., is the order in which the layers are deposited. In other words, N+1 is deposited and selectively cured over previously deposited and selectively cured layer N. The opening 32 converges to the apex 36 as the layer number increases.

The support structure of the present disclosure can be utilized by other systems in addition to those disclosed in FIGS. 1A and 1B. Such other systems can form three-dimensional articles through the deposition and fusion of plastic or metal powders, selective deposition from thermal or piezo activated inkjet printheads, and/or pressure extrusion of polymers or metals from heated nozzles to name some examples. The portions of the systems performing the physical fabrication can be referred to as "print engines" and it is to be understood that such a variety of different print engines may be applicable.

Figure 2:
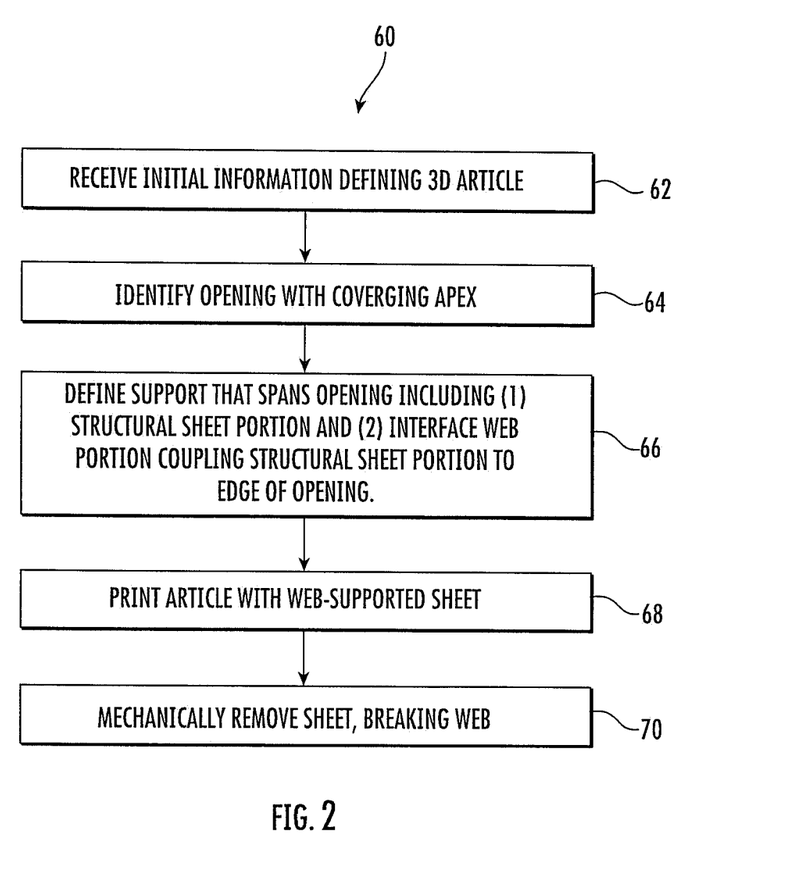
FIG. 2 is a flowchart depicting an embodiment of a method of manufacturing a three-dimensional article.

FIG. 2 is a flowchart depicting an embodiment of a method 60 of manufacturing a three-dimensional article 12. Steps of method 60 are illustrated diagrammatically in FIGS. 3-6. Steps 62-70 are not necessarily fully automated nor are they necessarily all performed on a single computer. Steps 62-66 may be performed using a computer-aided design system with a manual evaluation and data entry steps. Alternatively, steps 62-66 may be fully automated based upon a machine recognition of a condition. In FIGS. 3-6 an axis ±Z is illustrated. This is to indicate that the method 60 described can be performed with either of the three-dimensional printing system embodiments 2 or 42 described with respect to FIGS. 1A and 1B.

Figure 3A:
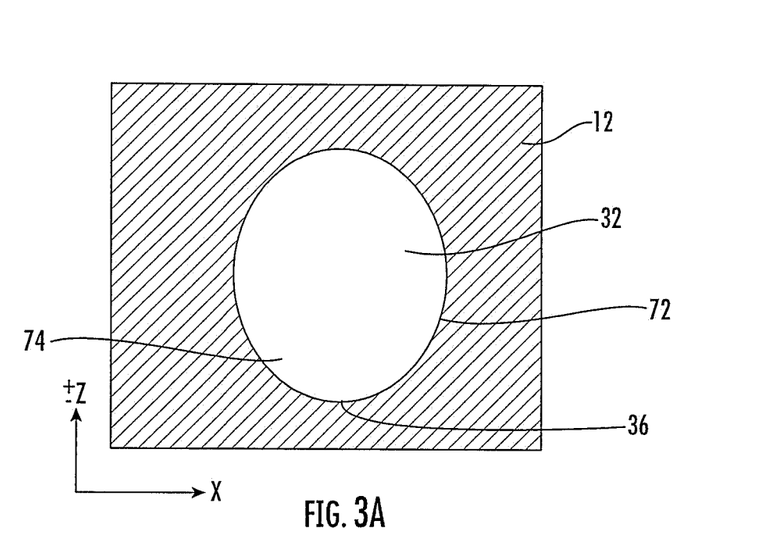
FIG. 3A depicts an embodiment of an article of manufacture having an internal opening.

According to step 62, initial information is received defining a three-dimensional article 12 to be manufactured. The information includes a file that defines the three-dimensional article 12. An exemplary simplified article 12 is depicted in FIG. 3A. In an illustrative embodiment, the article 12 is hollow.

According to step 64, an internal opening 32 is identified that is defined by a perimeter edge 72. In the illustrative embodiment, the perimeter edge 72 is fully defined by build material of the three-dimensional article 12. Also according to 64, a converging portion 74 of the opening is identified that ends in apex 36. In the illustrative embodiment, the article 12 has a first thickness along edge 72.

Figure 3B:
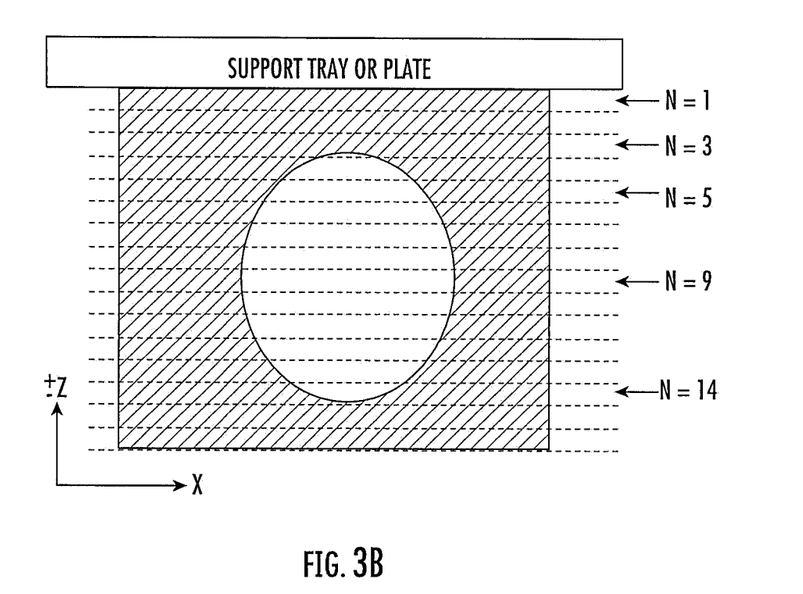
FIG. 3B depicts a layer formation sequence to form an article.

By "converging" it is implied that the opening 32 is decreasing in a lateral dimension with increasing layers. FIG. 3B is a simplified diagram depicting a layer sequence superposed onto the article 12. According to the figure, the opening 32 begins to converge with layer 9. Apex 36 is at layer 14. Thus, the lateral dimension along X is decreasing with layer number, or the derivative dW/dN is less than zero where dW is a differential width and dN is a differential layer number which equals one. Thus, dW>0 through layer 8 and then dW<0 after layer 9. An actual number of layers is probably much greater for a three-dimensional article—in the thousands—but 16 layers are shown for illustrative simplicity.

Figure 4:
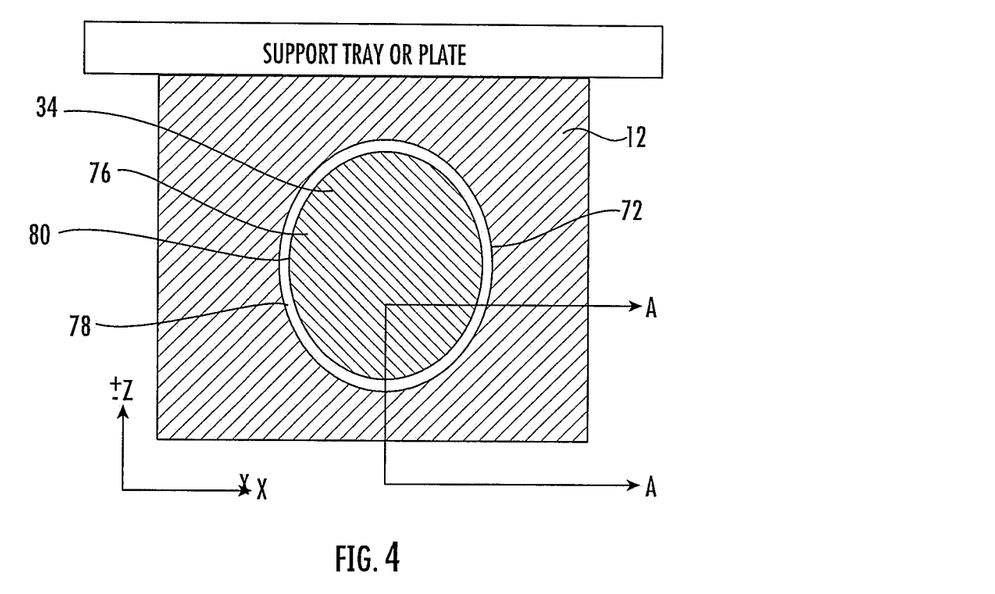
FIG. 4 is an illustration of a first embodiment of an article with an opening closed by a support structure.

According to step 66, a support structure 34 is defined that spans and closes the opening 32 as illustrated in FIG. 4. By "closing" the opening it is meant that there are essentially no openings remaining. The support structure 34 includes two parts including a structural sheet portion 76 and an interface web portion 78. The structural sheet portion 76 has a second thickness which is at least equal to 30% of the first thickness of article 12 along edge 72 in order to provide sufficient structural support to prevent shrinkage-related defects. Between edge 72 and sheet portion 76 is a narrow boundary contour 80 which is spanned by the interface web portion 78. The interface web portion 78 has a third thickness (minimum thickness within the boundary contour 80) that is less than half of second thickness of the structural sheet portion 76. This provides a "weakness contour" as will be explained infra. The interface web portion 78 provides a substantially or completely continuous connection along the boundary contour 80.

Figure 4A:
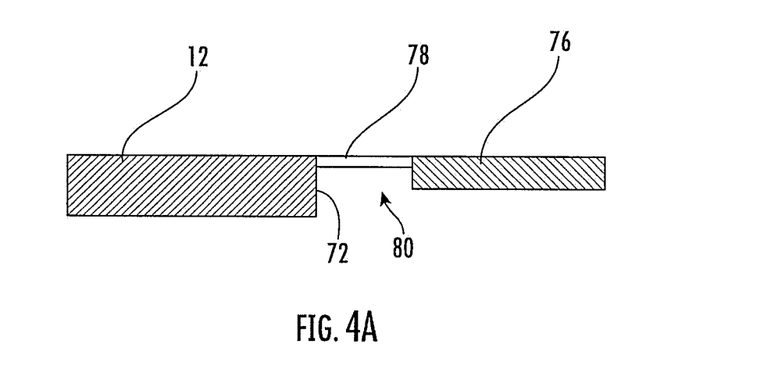
FIG. 4A is a cross-section taken from AA of FIG. 4 illustrating a first embodiment of an interface web portion.
Figure 5A:
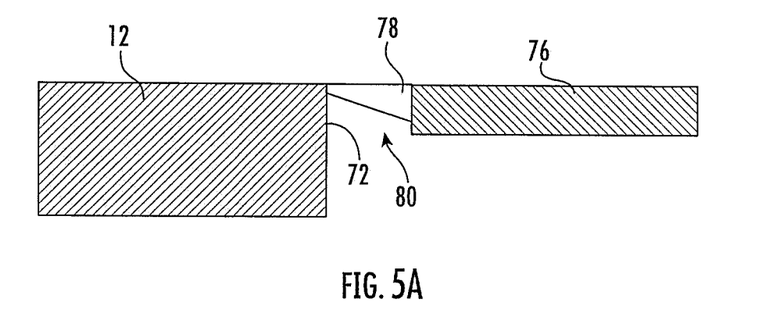
FIG. 5A is a cross-section taken from AA of FIG. 4 illustrating a second embodiment of an interface web portion.

FIGS. 4A and 5A are alternative cross sections taken from section AA of FIG. 4. In the illustrative embodiment of FIG. 4A, the interface web portion 78 has a constant thickness around the boundary contour 80. In the illustrative embodiment of FIG. 5A, the interface web portion has a trapezoidal cross section that will tend to preferentially break along the perimeter edge 72. In some embodiments, the connection between the web portion 78 and the structural sheet portion 76 can have a filleted edge. The web portion 78 is continuous in the sense that it completely or nearly completely closes the boundary contour 80 as opposed to a plurality of tab or point connections. In some embodiments there may be no holes in the support structure 34.

According to step 68, the three-dimensional article 12 with the support structure 34 is formed in a layer-by-layer manner. Examples of such a printing process has been described with respect to FIGS. 1A and 1B. In alternative embodiments, printing according to step 68 can be accomplished with layers of powder that are fused together with an energy beam (e.g., laser beam, particle beam, electron beam) or with printhead dispensing. The result is an article 12 and a support 34 that is formed from a single build material.

According to step 70, the structural sheet portion 76 is mechanically removed from the opening 32. In an illustrative embodiment it is "knocked out" by impacting a portion of the structural sheet portion 76. The support structure 34 preferentially breaks along a weakness contour which is within the boundary contour 80. For the embodiment depicted in FIG. 5A, the weakness contour would be very closely proximate to the edge 72 of opening 32.

Figure 6:
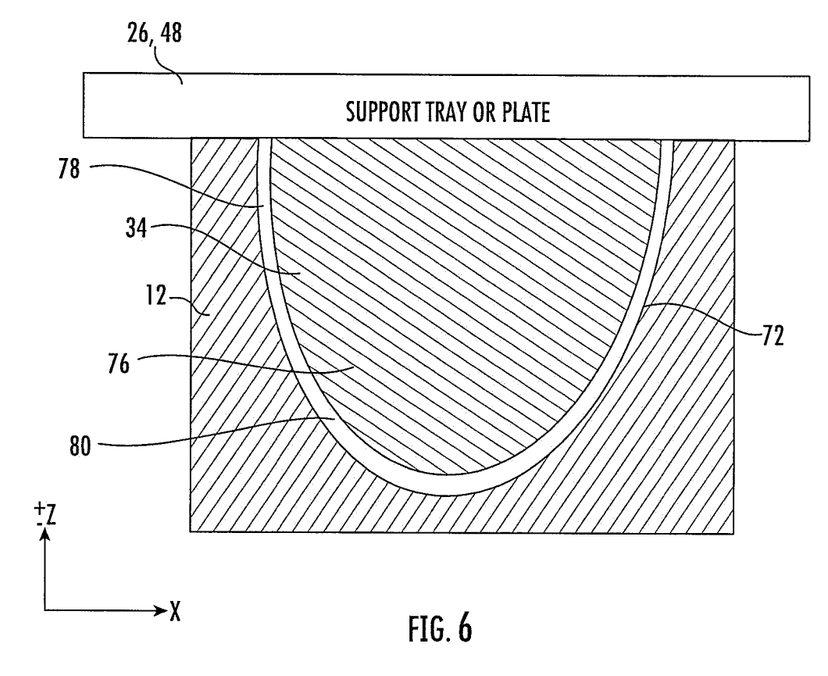
FIG. 6 is an illustration of a second embodiment of an article with an opening closed by a support structure.

FIG. 6 is an illustrative embodiment of another embodiment of a three-dimensional article 12 having a support structure 34. In this illustrative embodiment, part of the internal opening 32 is bounded by support or tray or plate 26 or 48. The boundary contour 80 extends along the edge 72 defined by the three-dimensional article 12. Because the support tray/plate 26/48 provide support to the article 12 along an upper/lower boundary there is no need for the interface web portion 78 along the upper/lower boundary. Along the boundary contour 80, the support structure can be defined as described supra including with respect to FIGS. 4A and 5A.

The specific embodiments and applications thereof described above are for illustrative purposes only and do not preclude modifications and variations encompassed by the scope of the following claims.

What is claimed:

1. A method of manufacturing a three-dimensional article with a sequence of layers comprising:

receiving a data file defining a hollow three-dimensional article to be formed from a build material;

analyzing the data file to identify an opening that converges to an apex along the sequence of layers, the opening defined by a perimeter edge of the three-dimensional article that extends at least partly in a vertical direction; and defining a support structure attached to the perimeter edge that closes the opening including:

a structural sheet portion that defines a majority of an area of the support structure except for a boundary contour between the structural sheet portion and the perimeter edge; and an interface web portion that substantially closes the boundary contour and defines a weakness contour for removing the structural sheet portion; and printing the article with the attached support structure.

2. The method of claim 1 wherein the perimeter edge completely bounds the opening.

3. The method of claim 1 wherein a combination of the perimeter edge and a support tray or plate bounds the opening.

4. The method of claim 1 wherein the three-dimensional article has a model thickness along the perimeter edge, the structural sheet has a sheet thickness of at least 30% of the model thickness along the perimeter edge.

5. The method of claim 1 wherein the structural sheet has a sheet thickness, the interface web portion has a thickness that is less than 50% of the sheet thickness.

6. The method of claim 1 wherein the article with the attached support structure is formed from a single build material using a stereolithographic process.

7. The method of claim 6 further comprising impacting the structural sheet material to sever the support from the three-dimensional article along the weakness contour.

8. A computer-readable storage medium for manufacturing a three-dimensional article with a sequence of layers, the computer readable storage medium being non-transitory and storing software instructions that in response to execution by a processor cause a three-dimensional printing system to:

receive a data file defining a hollow three-dimensional article to be formed from a build material;

analyze the data file to identify an opening that converges to an apex along the sequence of layers, the opening defined by a perimeter edge of the three-dimensional article that extends at least partly in a vertical direction; and define a support structure attached to the perimeter edge that closes the opening including:

a structural sheet portion that defines a majority of an area of the support structure except for a boundary contour between the structural sheet portion and the perimeter edge; and an interface web portion that substantially closes the boundary contour and defines a weakness contour for removing the structural sheet portion; and operate a print engine to fabricate the three-dimensional article and the support structure.

9. The computer-readable storage medium of claim 8 wherein the perimeter edge completely bounds the opening.

10. The computer-readable storage medium of claim 8 wherein a combination of the perimeter edge and a support tray or plate bounds the opening.

11. The computer-readable storage medium of claim 8 wherein the three-dimensional article has a model thickness along the perimeter edge, the structural sheet has a sheet thickness of at least 30% of the model thickness along the perimeter edge.

12. The computer-readable storage medium of claim 8 wherein the structural sheet has a sheet thickness, the interface web portion has a thickness that is less than 50% of the sheet thickness.

13. The computer-readable storage medium of claim 8 wherein the print engine is operated to fabricate the three-dimensional article and the support structure from a single build material using a stereolithographic process.

14. A three-dimensional printing system for manufacturing a three-dimensional article with a sequence of layers, the three-dimensional printing system including:
 a print engine for fabricating the three-dimensional article; and
 a controller for controlling the print engine and including a processor coupled to a non-transitory storage medium, the non-transitory storage medium storing software instructions that, when executed by the processor, perform the following steps:
  receive a data file defining a hollow three-dimensional article to be formed from a build material;
  analyze the data file to identify an opening that converges to an apex along the sequence of layers, the opening defined by a perimeter edge of the three-dimensional article that extends at least partly in a vertical direction; and
  define a support structure attached to the perimeter edge that closes the opening including:
   a structural sheet portion that defines a majority of an area of the support structure except for a boundary contour between the structural sheet portion and the perimeter edge; and
   an interface web portion that substantially closes the boundary contour and defines a weakness contour for removing the structural sheet portion; and
  operate the print engine to fabricate the three-dimensional article.

15. The three-dimensional printing system of claim 14 wherein the perimeter edge completely bounds the opening.

16. The three-dimensional printing system of claim 14 wherein a combination of the perimeter edge and a support tray or plate bounds the opening.

17. The three-dimensional printing system of claim 14 wherein the three-dimensional article has a model thickness along the perimeter edge, the structural sheet has a sheet thickness of at least 30% of the model thickness along the perimeter edge.

18. The three-dimensional printing system of claim 14 wherein the structural sheet has a sheet thickness, the interface web portion has a thickness that is less than 50% of the sheet thickness.

19. The three-dimensional printing system of claim 14 wherein the print engine is operated to fabricate the three-dimensional article using a stereolithographic process.

20. The three-dimensional printing system of claim 19 wherein the three-dimensional article and the support structure are formed from the same build material.

\* \* \* \* \*